United States Patent
Nishiyama et al.

(10) Patent No.: US 10,088,013 B2
(45) Date of Patent: Oct. 2, 2018

(54) MANUFACTURING METHOD FOR MULTI-LAYERED RING

(71) Applicant: TOYOTA JIDOSHA KABUSHIKI KAISHA, Toyota-shi (JP)

(72) Inventors: Tomohiko Nishiyama, Toyota (JP); Akira Takashima, Toyota (JP); Takeshi Umeda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 174 days.

(21) Appl. No.: 14/898,586

(22) PCT Filed: May 14, 2014

(86) PCT No.: PCT/JP2014/002551
§ 371 (c)(1),
(2) Date: Dec. 15, 2015

(87) PCT Pub. No.: WO2014/207984
PCT Pub. Date: Dec. 31, 2014

(65) Prior Publication Data
US 2016/0138674 A1 May 19, 2016

(30) Foreign Application Priority Data
Jun. 25, 2013 (JP) .................................. 2013-132604

(51) Int. Cl.
C21D 9/40 (2006.01)
B21D 53/14 (2006.01)
(Continued)

(52) U.S. Cl.
CPC .............. *F16G 5/16* (2013.01); *B21D 53/14* (2013.01); *B21D 53/16* (2013.01); *B23P 15/00* (2013.01);
(Continued)

(58) Field of Classification Search
CPC .... C23C 8/24; C23C 8/80; C21D 1/06; C21D 9/40; F16G 5/16; B21D 35/007;
(Continued)

(56) References Cited

U.S. PATENT DOCUMENTS

| | | | |
|---|---|---|---|
| 6,631,542 B1 * | 10/2003 | Imai | B23P 15/00 148/228 |
| 2003/0045387 A1 | 3/2003 | Ishii et al. | |
| 2012/0291923 A1 | 11/2012 | Nishida et al. | |

FOREIGN PATENT DOCUMENTS

| | | |
|---|---|---|
| JP | 2001-329317 A | 11/2001 |
| JP | 2003 49906 | 2/2003 |

(Continued)

OTHER PUBLICATIONS

International Search Report dated Aug. 5, 2014 in PCT/JP2014/002551 filed May 14, 2014.

*Primary Examiner* — Jermie Cozart
(74) *Attorney, Agent, or Firm* — Oblon, McClelland, Maier & Neustadt, L.L.P.

(57) ABSTRACT

A manufacturing method includes, cutting out a plurality of rings, polishing the rings, adjusting the plurality of rings so that they exhibit circumferential lengths respectively predetermined for them, nitriding the plurality of rings, and assembling in order to layer the plurality of rings into a multi-layered ring; wherein after the rings are cut out from the pipe, each of them is polished one by one so that their order is not changed; in nitriding, they are subjected to a nitriding process in a state where they are set in a jig in order to keep their order; and in assembling, the rings are assembled so that rings that were parts originally adjacent to each other in a state of the pipe become layers that are adjacent to each other in the multi-layered ring.

5 Claims, 14 Drawing Sheets

(51) Int. Cl.
  *F16G 5/16* (2006.01)
  *B23P 15/00* (2006.01)
  *C23C 8/02* (2006.01)
  *C23C 8/26* (2006.01)
  *C23C 8/10* (2006.01)
  *C23C 8/34* (2006.01)
  *B21D 53/16* (2006.01)
  *C21D 9/50* (2006.01)
  *C21D 1/06* (2006.01)

(52) U.S. Cl.
  CPC ............ *C21D 9/40* (2013.01); *C21D 9/50* (2013.01); *C23C 8/02* (2013.01); *C23C 8/10* (2013.01); *C23C 8/26* (2013.01); *C23C 8/34* (2013.01); *C21D 1/06* (2013.01); *C21D 2261/00* (2013.01); *Y10T 29/49798* (2015.01); *Y10T 29/49813* (2015.01)

(58) Field of Classification Search
  CPC ... B21D 53/14; B21D 53/16; Y10T 29/49798; Y10T 29/49813
  See application file for complete search history.

(56) References Cited

FOREIGN PATENT DOCUMENTS

| | | |
|---|---|---|
| JP | 2003-105443 A | 4/2003 |
| JP | 2005 155755 | 6/2005 |
| JP | 2009 249646 | 10/2009 |
| JP | 2011 185300 | 9/2011 |
| JP | 2013 52432 | 3/2013 |
| WO | 2011 077579 | 6/2011 |

\* cited by examiner

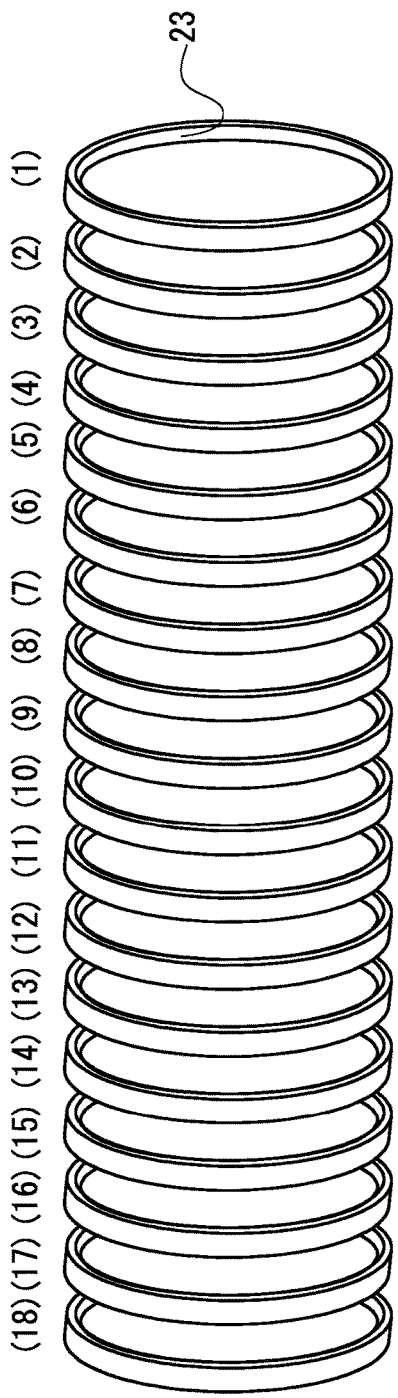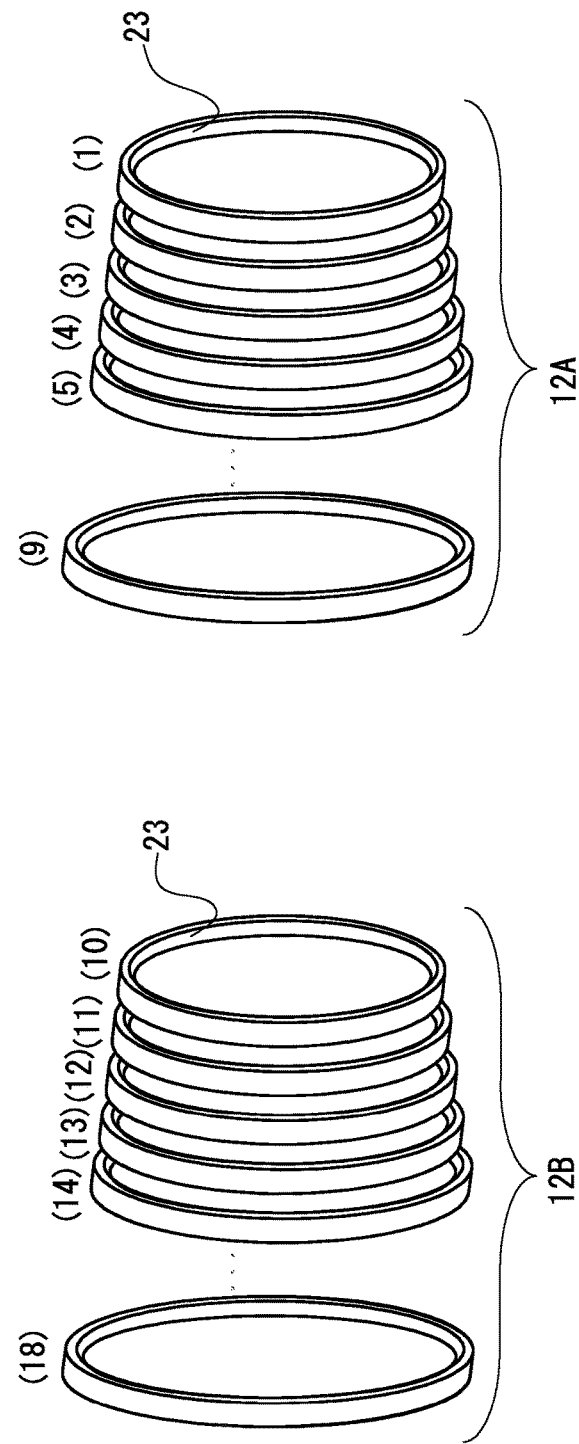
Fig. 9A
Fig. 9B

MANUFACTURING METHOD FOR MULTI-LAYERED RING

TECHNICAL FIELD

The present invention relates to a manufacturing method for a multi-layered ring used for a transmission belt of a belt-type continuously variable transmission for a vehicle.

BACKGROUND ART

There is a belt-type CVT (Continuously Variable Transmission) capable of changing the gear ratio of a transmission of a vehicle in a stepless manner according to the traveling state of the vehicle (for example, Patent Literature 1). FIG. 13 is a perspective view showing an endless metal belt 10 used for the CVT. FIG. 14 is a partial perspective view showing a part of the endless metal belt 10 in which the endless metal belt 10 is partially disassembled.

The endless metal belt 10 is obtained by concatenating a plurality of metal elements 11 each of which is a plate-like element in the thickness direction and forming the concatenated metal elements 11 into a ring shape as a whole. To support the plurality of metal elements 11 in the ring shape, multi-layered rings 12 are inserted into the metal elements 11 from both sides thereof in the width direction.

Each of the multi-layered rings 12 is formed by stacking six to twelve endless metal rings 13 having slightly different circumferential lengths on each other. (In FIG. 13, only three endless metal rings are layered because the structure is simplified for clarifying the illustration.)

For the purpose of explaining, the inner most endless metal ring 13 is referred to as a "first ring" and the endless metal ring 13 layered on the outer side of the first ring is referred to as a "second ring". Further, other metal rings 13 are named in such a manner that their numbers increase from the inner side toward the outer side of the rings. The circumferential length of a ring is slightly longer than that of a ring disposed immediately inside that ring. Therefore, when the outer-side ring is layered on the inner-side ring, these rings are substantially in intimate contact with each other throughout the entire circumference.

To manufacture the multi-layered ring 12, it is necessary to control the circumferential length of each endless metal ring 13 in an extremely strict manner so that the clearance between an inner ring and the ring disposed immediately outside that ring (hereinafter called an "inter-layer clearance") is smaller than a prescribed tolerance.

For example, when the inter-layer clearance between the k-th ring and the (k+1)-th ring is larger than the prescribed tolerance, it causes these rings to be rubbed against each other and thus eventually to be torn.

Further, six to twelve rings have to be successively layered on each other. Therefore, if the inter-layer clearance between the k-th ring and the (k+1)-th ring is larger than the prescribed tolerance, it makes it impossible to layer the (k+2)-th ring or the (k−1)-th ring outside or inside them, thus eventually making it impossible to assemble them into a multi-layered ring.

Needless to say, if there is no inter-layer clearance at all or if, when taking the plate thickness into consideration, the outer circumferential length of the k-th ring is larger than the inner circumferential length of the (k+1)-th ring, they cannot be layered on each other as a matter of course.

Therefore, the circumferential lengths of rings are adjusted so that these rings exhibit circumferential lengths respectively predetermined for them. That is, each ring is stretched to its determined circumferential length by applying a tension (tensile force). Note that there are predetermined target values for the circumferential lengths for the rings, i.e., the ring that will become the first ring, the ring that will become the second ring, and so on. For this process in which a ring is stretched by applying a tension (tensile force), various technical ideas have been proposed to adjust the circumferential length with a very high accuracy.

For example, Japanese Unexamined Patent Application Publications No. 2011-185300 (Patent Literature 2) and No. 2013-52432 (Patent Literature 3), which were filed by the applicant of the present application, disclose circumferential length adjustment devices and circumferential length adjustment processes in which considerable contrivances are made.

Meanwhile, a multi-layered ring, i.e., each of the endless metal belts constituting the multi-layered ring, needs to exhibit a high strength as a matter of course. Therefore, after the circumferential length adjustment, a heat treatment(s) such as aging, oxidizing, and nitriding is performed in order to improve, for example, the hardness and/or the wear resistance of the multi-layered ring (Patent Literatures 4 and 5).

CITATION LIST

Patent Literature

Patent Literature 1: Japanese Unexamined Patent Application Publication No. 2005-155755
Patent Literature 2: Japanese Unexamined Patent Application Publication No. 2011-185300
Patent Literature 3: Japanese Unexamined Patent Application Publication No. 2013-52432
Patent Literature 4: Japanese Unexamined Patent Application Publication No. 2009-249646
Patent Literature 5: International Patent Publication No. WO2011/077579

SUMMARY OF INVENTION

Technical Problem

When rings are subjected to a heat treatment(s) (in particular, aging, oxidizing, and nitriding), the variations in the circumferential lengths tend to increase. That is, even if the variations in the circumferential lengths can be controlled to a narrow range, the variations tend to increase by a factor of two or three after the heat treatment. It can be presumed that this increase relates to the fact that the heat treatment involves a large number of factors that cannot be accurately controlled, such as temperature distribution in a furnace and gas concentration distribution in the furnace. However, the exact knowledge about this phenomenon has not been obtained yet. Further, there could be another problem that factors that cannot be completely controlled, such as the fact that the elongation of a ring per degree (° C.) of temperature (expansion rate) is large, have a large influence on the change in the circumferential length.

However, as described above, the permissible range of the accuracy for the circumferential length of each of the rings that are assembled into a multi-layered ring is narrow. Therefore, in the past, it has been absolutely necessary to perform a task in which: the circumferential length of each ring is measured one by one after the heat treatment; the measured rings are sorted out according to their lengths; and then, rings that can be combined as a set of rings are selected. However, this task is excessively complicated and its load is large in terms of the time and the cost. Further, there is another problem that rings for which appropriate rings to be combined therewith are not found accumulate as stock.

An object of the present invention is to further improve the production efficiency of the multi-layered ring.

Solution to Problem

A manufacturing method for a multi-layered ring according to the present invention is a manufacturing method for a multi-layered ring, the multi-layered ring being formed by layering a plurality of endless metal rings having slightly different circumferential lengths on one another, the manufacturing method including:

a welding step of welding ends of a steel plate together and thereby forming a cylindrical pipe;

a ring cutting-out step of cutting the pipe at a predetermined width in a direction perpendicular to a central axis of the pipe and thereby cutting out a plurality of rings;

a polishing step of polishing the rings;

a circumferential length adjustment step of adjusting the plurality of rings so that they exhibit circumferential lengths respectively predetermined for them;

a nitriding step of nitriding the plurality of rings; and an assembling step of assembling in order to layer the plurality of rings into a multi-layered ring, in which the assembling step is performed so that rings that were parts originally adjacent to each other in a state of the pipe become layers that are adjacent to each other in the multi-layered ring.

In the present invention, in the polishing step, each of the plurality of rings is polished one by one so that an order in which the plurality of rings are cut out in the cutting-out step can be kept track of In the present invention, the nitriding step is preferably performed in a state where the plurality of rings are set in a jig in such a manner that rings that were parts originally adjacent to each other in the state of the pipe are disposed adjacent to each other in the jig.

In the present invention, in the circumferential length adjustment step, the circumferential length of each ring is preferably adjusted so that rings that were parts originally adjacent to each other in the state of the pipe become layers that are adjacent to each other in the multi-layered ring.

A manufacturing method for a multi-layered ring according to the present invention is a manufacturing method for a multi-layered ring, the multi-layered ring being formed by layering a plurality of endless metal rings having slightly different circumferential lengths on one another, the manufacturing method including:

a welding step of welding ends of a steel plate together and thereby forming a cylindrical pipe;

a ring cutting-out step of cutting the pipe at a predetermined width in a direction perpendicular to a central axis of the pipe and thereby cutting out a plurality of rings;

a polishing step of polishing the rings;

a circumferential length adjustment step of adjusting the plurality of rings so that they exhibit circumferential lengths respectively predetermined for them;

a nitriding step of nitriding the plurality of rings; and an assembling step of assembling in order to layer the plurality of rings into a multi-layered ring, in which in the assembling step, a predetermined number of rings among the plurality of rings cut out from a single pipe are assembled into one multi-layered ring.

A manufacturing method for a multi-layered ring according to the present invention is a manufacturing method for a multi-layered ring, the multi-layered ring being formed by layering a plurality of endless metal rings having slightly different circumferential lengths on one another, the manufacturing method including:

a welding step of welding ends of a steel plate together and thereby forming a cylindrical pipe;

a ring cutting-out step of cutting the pipe at a predetermined width in a direction perpendicular to a central axis of the pipe and thereby cutting out a plurality of rings;

a polishing step of polishing the rings;

a circumferential length adjustment step of adjusting the plurality of rings so that they exhibit circumferential lengths respectively predetermined for them;

a nitriding step of nitriding the plurality of rings; and an assembling step of assembling in order to layer the plurality of rings into a multi-layered ring, in which in the assembling step, a predetermined number of rings among the plurality of rings cut out from a part of the pipe which has length of a half of the pipe are assembled into one multi-layered ring.

Advantageous Effects of Invention

In the present invention, a plurality of rings are assembled into a multi-layered ring so that rings that were parts originally adjacent to each other in the state of the pipe become layers that are adjacent to each other in the multi-layered ring.

Note that it can be expected that rings that are adjacent to each other in the pipe have substantially the same compositions, plate thicknesses, and welding quality as each other. Therefore, it can be expected that for layers that are adjacent to each other in a multi-layered ring, even if they elongate to some degree at the stage of the heat treatment (nitriding step), their elongations have substantially the same tendencies. This leads to the elimination of the task of the ring length measurement, the sorting out, and the selection after the heat treatment, and consequently reduces the troublesome processes and the cost and improves the production efficiency.

BRIEF DESCRIPTION OF DRAWINGS

FIG. 9 schematically shows a state after circumferential length adjustments are performed for rings so that they have target circumferential lengths of the respective layers;

DESCRIPTION OF EMBODIMENTS

Figure 1:
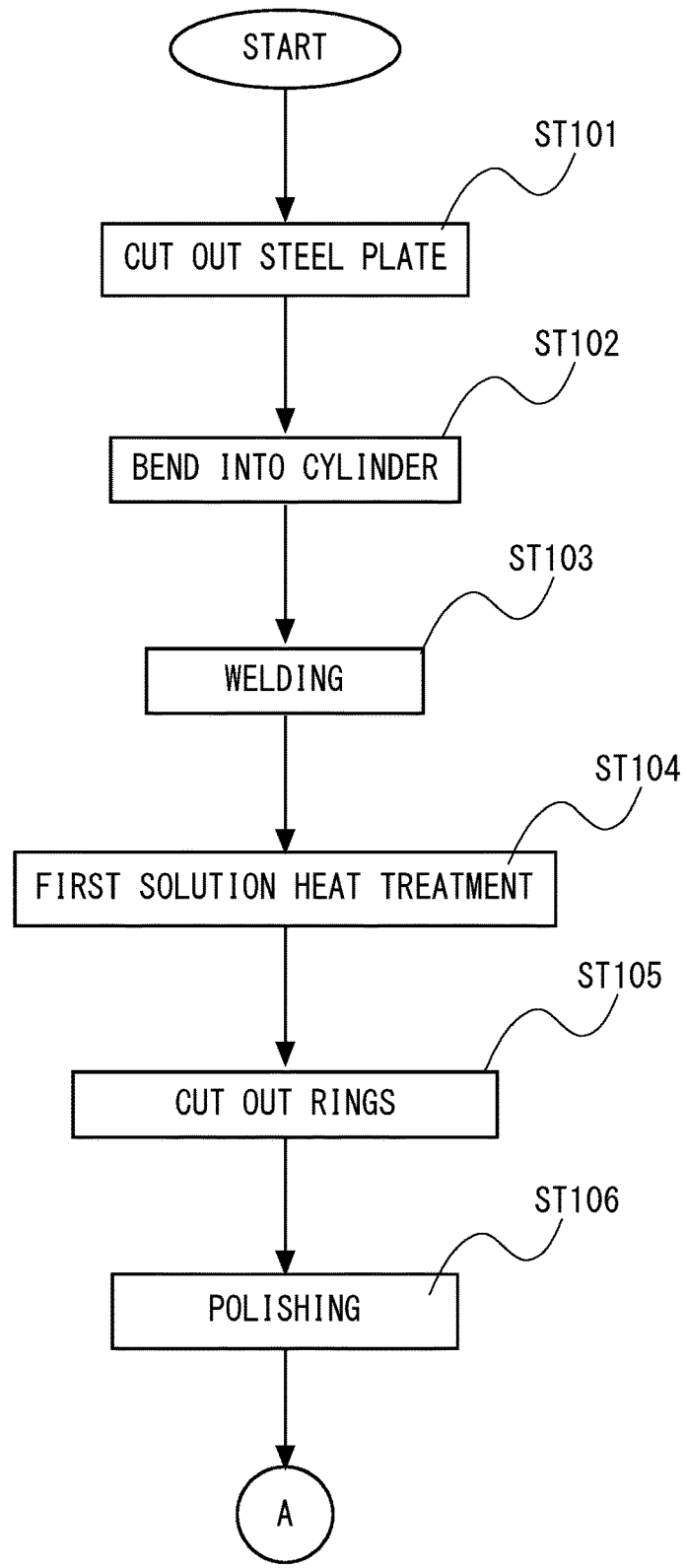
FIG. 1 is a flowchart of a manufacturing method for a multi-layered ring.

Exemplary embodiments according to the present invention are shown in the drawings and explained with reference to symbols assigned to elements in the drawings.

First Exemplary Embodiment

A first exemplary embodiment of a multi-layered ring manufacturing method according to the present invention is explained.

Figure 2:
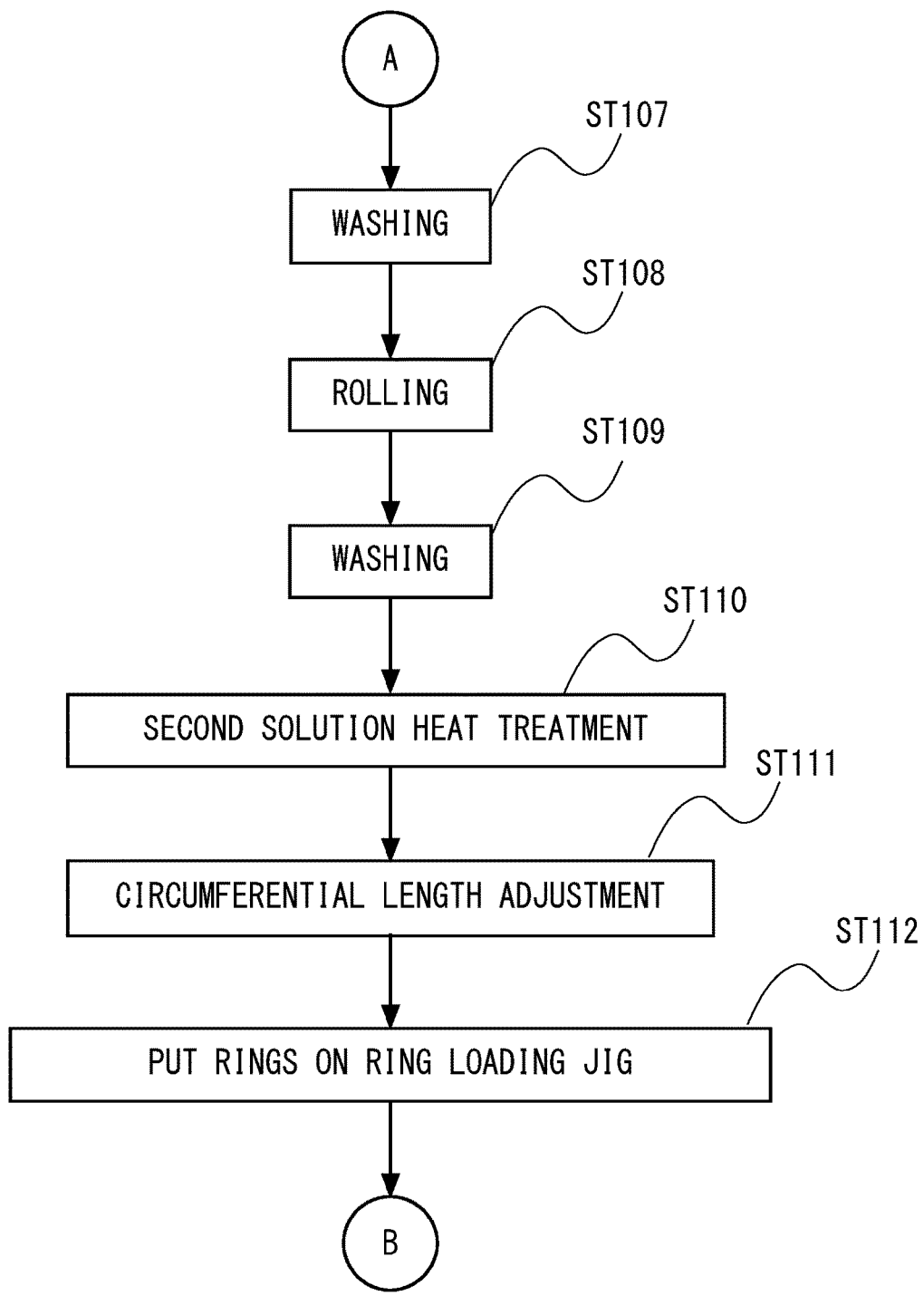
FIG. 2 is a flowchart for the manufacturing method for the multi-layered ring.
Figure 3:
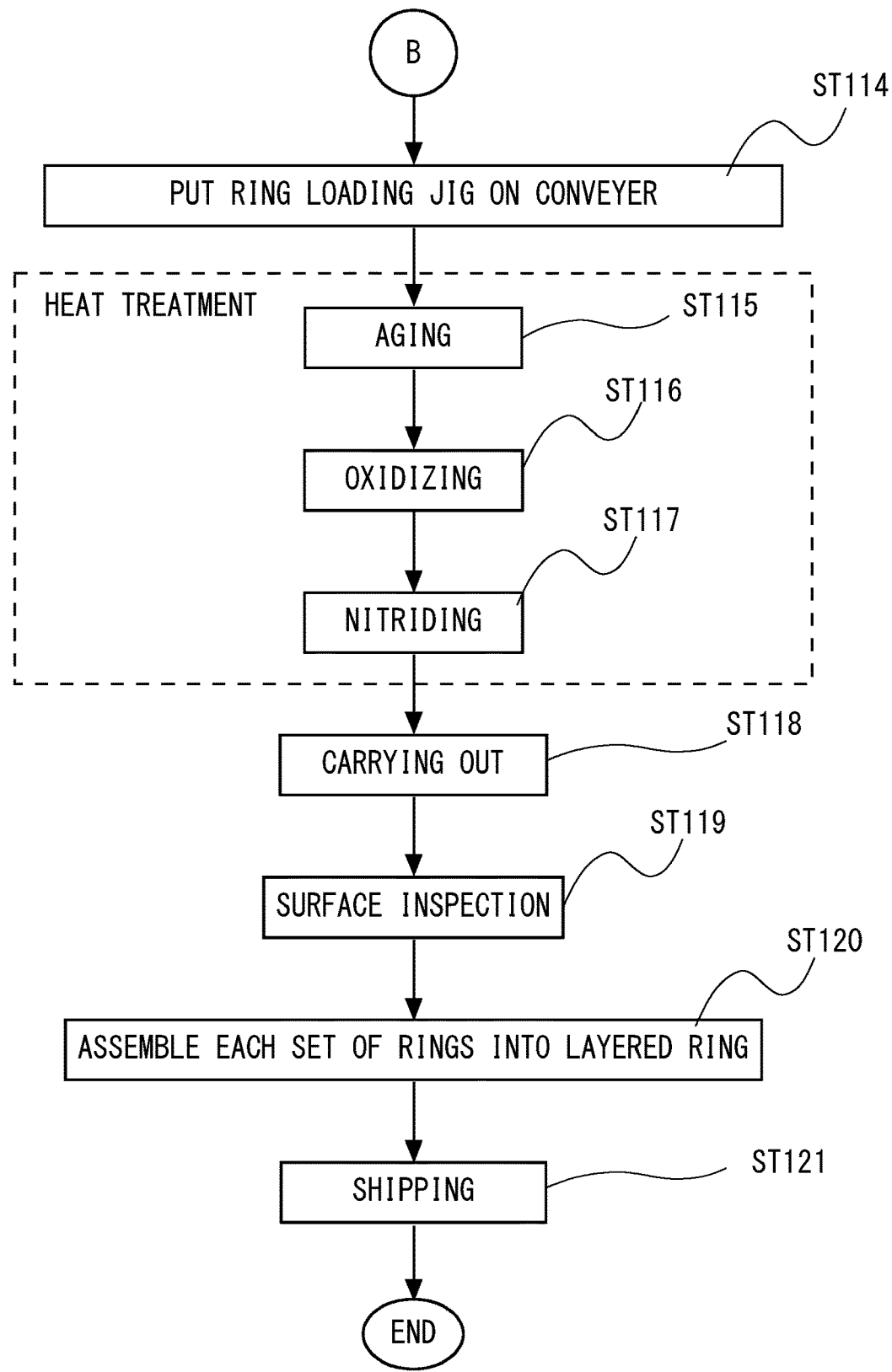
FIG. 3 is a flowchart for the manufacturing method for the multi-layered ring.

FIGS. 1 to 3 show a flowchart of a multi-layered ring manufacturing method.

Each step is explained in turn hereinafter.

Figure 4:
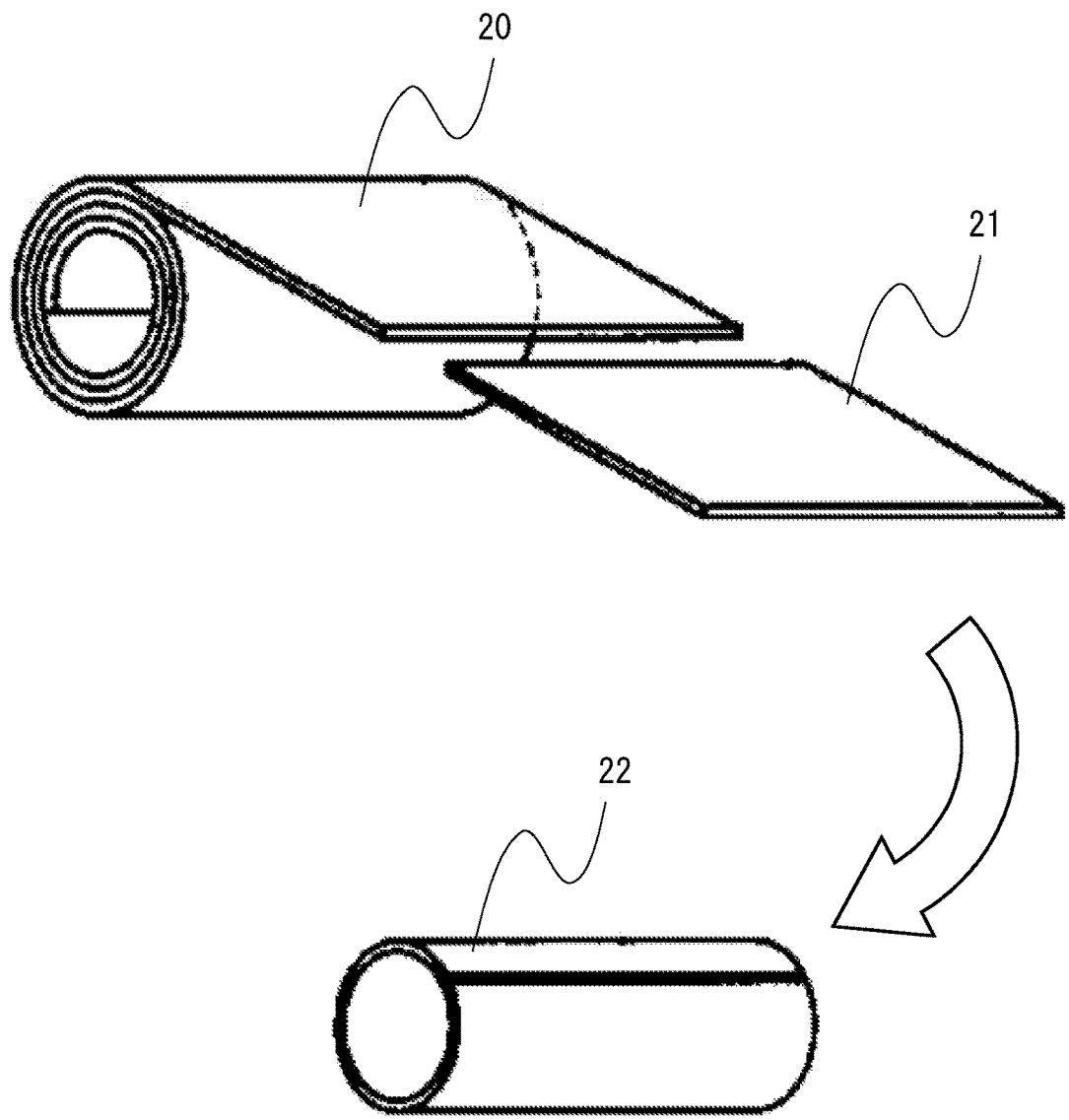
FIG. 4 shows a state where a steel plate cut out from a roll is formed into a pipe.

Firstly, a steel plate 21 is cut out from a roll 20 (ST101). After the cut-out steel plate 21 is bent into a cylindrical shape (ST102), its ends are welded together and a pipe 22 is thereby created (ST103). FIG. 4 shows a state where the steel plate 21 cut out from the roll 20 is formed into the pipe 22. Note that the material for the roll 20 is steel such as maraging steel and stainless steel.

Figure 5:
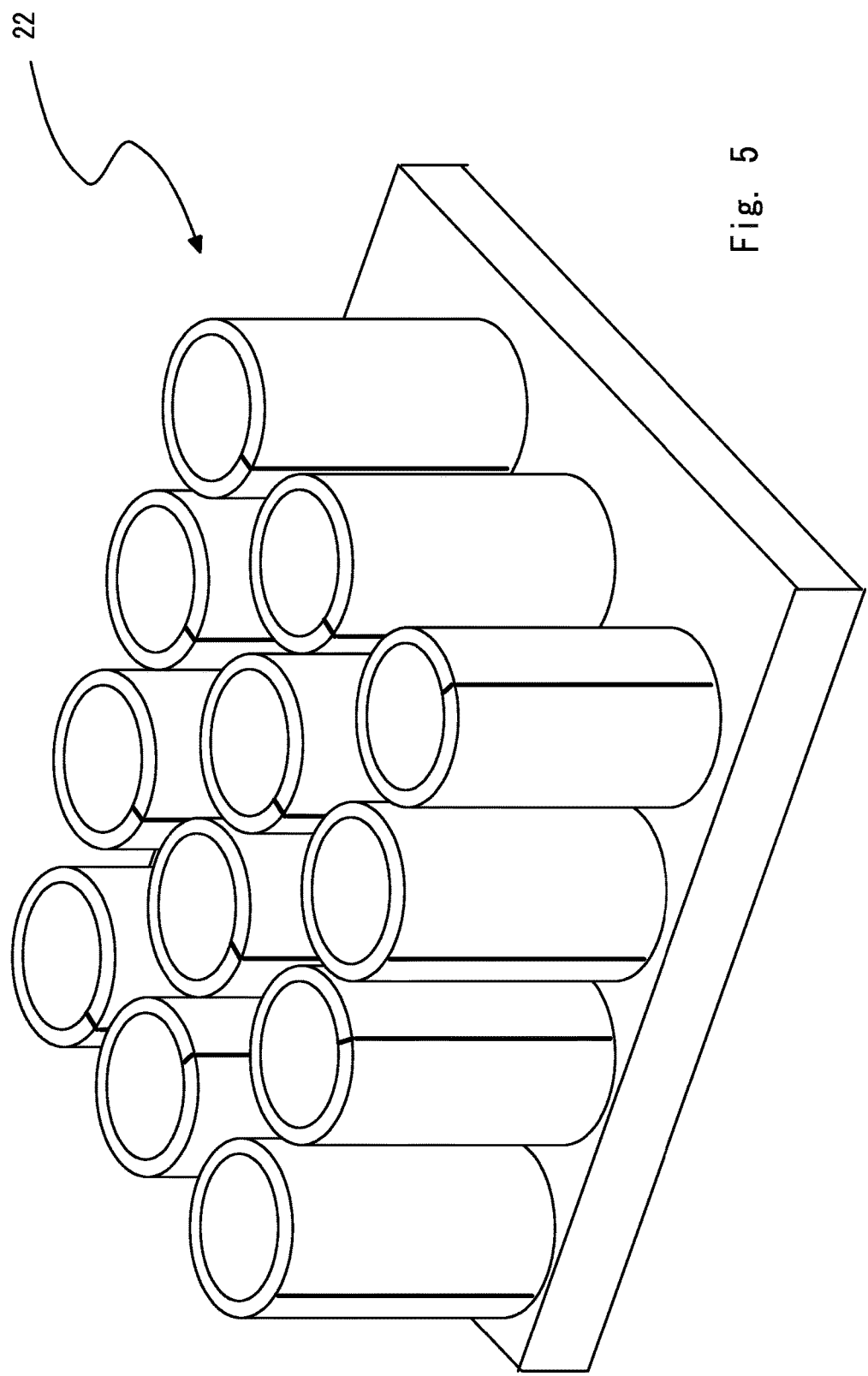
FIG. 5 shows a state where 12 pipes are subjected to a solution heat treatment together.

Next, a first solution heat treatment for eliminating the effect of the heat in the welding process is performed (ST104). In this example, 12 pipes 22 are processed in a batch (see FIG. 5). (Needless to say, the number of pipes in one batch is not limited to 12.)

Next, each pipe 22 is cut in a direction perpendicular to the central axis of the pipe 22 and rings 23 are thereby cut out from the pipe 22 (ST105). This step is one of the important features of the present invention and hence will be explained hereinafter in detail.

As an example, assume that one complete multi-layered ring is formed by layering nine layers of rings 23 on one another. Further, assume that 18 rings 23 are cut out from a single pipe 22 in the ring cutting-out step. That is, a plurality of rings 23 corresponding to two of multi-layered rings are cut out from a single pipe 22.

Figure 6:
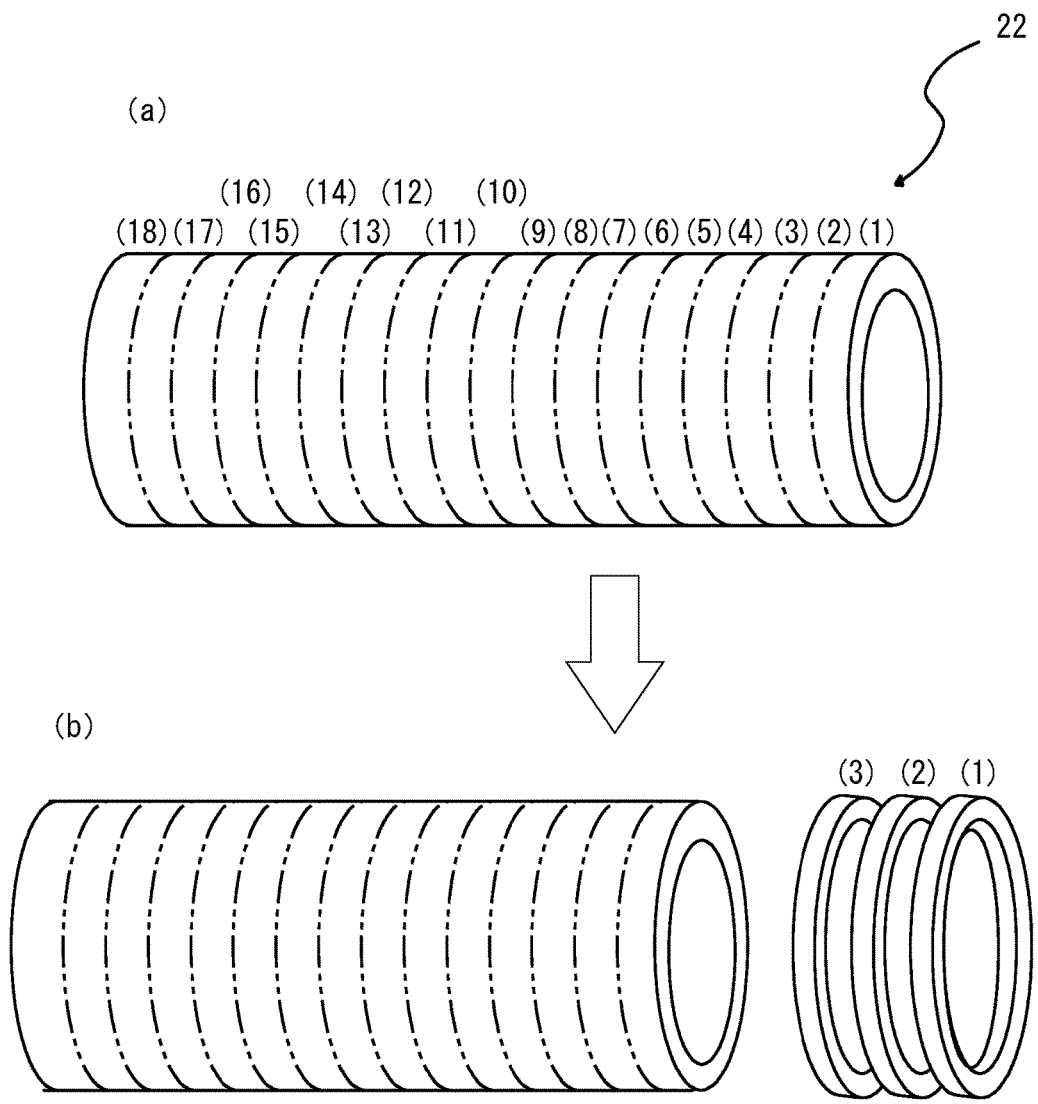
FIG. 6 shows a state where 18 rings are cut out from a single pipe.
Figure 7:
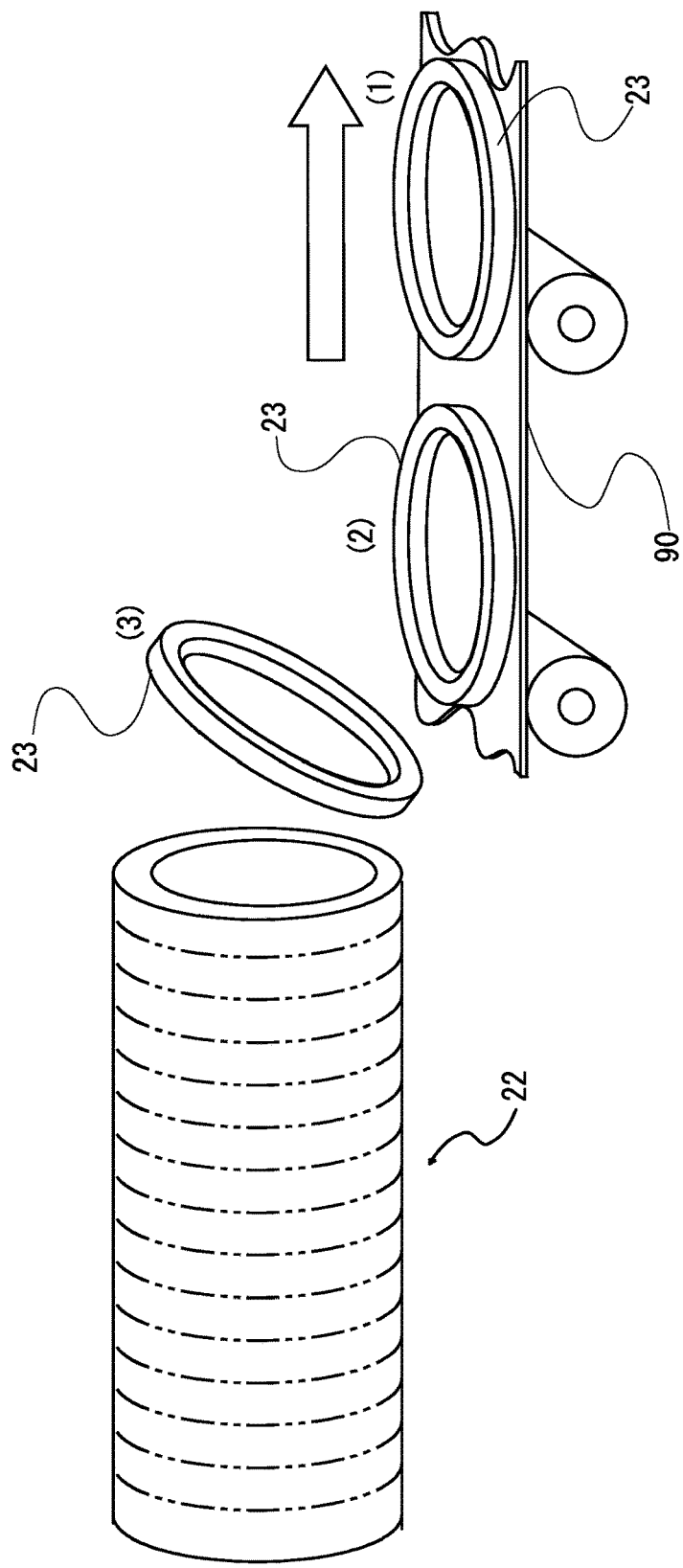
FIG. 7 shows a state where 18 rings are cut out from a single pipe.
Figure 8:
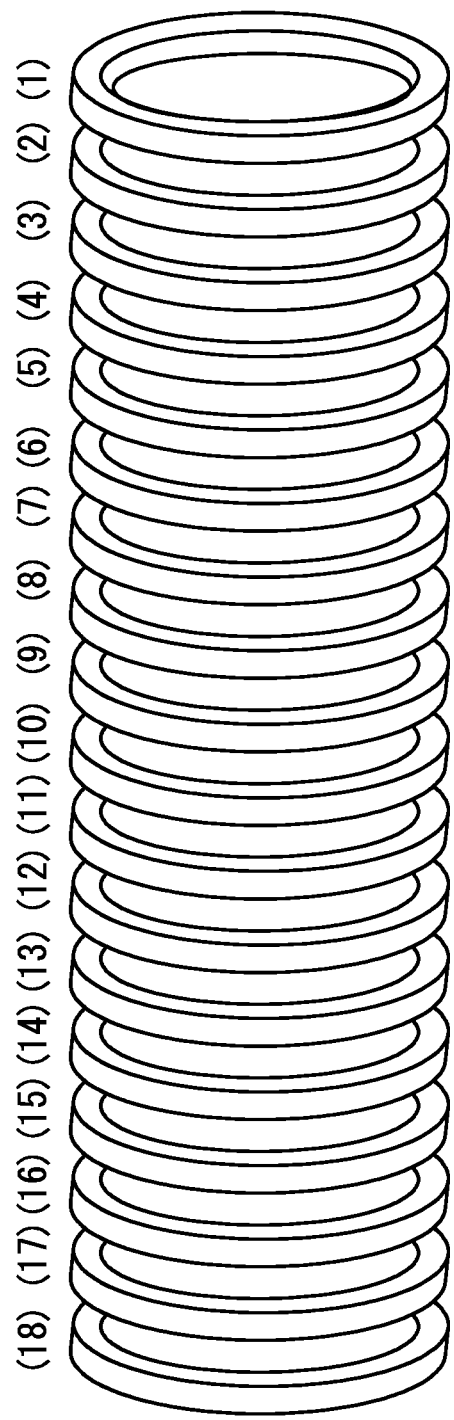
FIG. 8 shows a state where 18 rings are cut out from a single pipe.

FIGS. 6, 7 and 8 show states where 18 rings 23 are cut out from a single pipe 22.

The important point in this process is, when a plurality of rings 23 (18 rings 23 in this example) are cut out from a single pipe 22, to keep the order of the cut-out rings 23 without changing it from the order in which these cut-out rings are originally located in the original pipe state before the cutting-out step.

(The truly important point is the mutual positional relation among the cut-out rings 23, i.e., the information on which of places these cut-out rings were originally located with respect to each other in the pipe 22. However, for easier understanding, numbers assigned to the rings in an orderly manner from the right end of the pipe are used as information on the mutual positional relation in the pipe in the following explanation.)

FIG. 6(a) shows a pipe 22 before rings 23 are cut out from it. Assume that numbers are assigned to sections of this pipe 22 at intervals corresponding to the width of the rings 23 from the right end of the pipe 22. Since 18 rings 23 are cut out from the single pipe 22, numbers 1 to 18 are assigned at the predetermined width intervals from the right end of the pipe 22. Then, as shown in FIG. 6(b), the pipe 22 is cut in round slices from the right end. It should be noted that the order of the rings 23 should be kept even after they are cut out. That is, the rings 23 should be managed so that the mutual positional relation in the order of the rings 23 is not disrupted. For example, as shown in FIG. 7, the rings 23 may be cut out from the right end of the pipe 22 in the numerical order and the cut-out rings 23 may be conveyed by a belt conveyer 90 in the order in which they have been cut out. By doing so, the order of the rings 23 can be kept without being disrupted (see FIG. 8).

Note that, for example, if the cut-out rings 23 are put in a tray in a disorderly manner irrespective of their order, the information on the mutual positional relation among the rings 23, i.e., the information on which of places the rings are originally located with respect to each other in the pipe 22, is lost. Therefore, it is important to keep or manage the order of the rings 23 after the rings 23 are cut out from the pipe 22.

Any method capable of keeping the order of the rings 23 may be used. That is, the method is not limited to any specific method. For example, the rings 23 may be put in a belt conveyer, may be put in a turntable, or may be put in a tray in an orderly manner so that their order is kept.

Next, the cut-out rings are polished (ST106). Burrs are removed and corners are rounded (chamfering). It is also important to keep the order of the rings 23 so that it is not disrupted in this polishing process.

For example, each of the rings may be polished one by one by using a brush. Alternatively, removal of burrs and rounding (chamfering) for the rings may be performed one by one by laser for each ring. Further, each of the rings may be polished one by one by using a barrel.

Note that it is important to keep the order of the rings in the polishing process. Therefore, for example, it is undesirable to barrel-polish the rings all together at the same time.

After the polishing (ST106), washing (ST107), rolling (ST108), washing (ST109), and a second solution heat treatment (ST110) are performed in this order. The process in each of these steps is known. However, it is important to keep the order of the rings 23 throughout these steps.

Note that in the rolling (ST108), each of the rings 23 is rolled so as to have a predetermined thickness. For example, each of the rings 23 is sandwiched between a pair of reduction rollers in the thickness direction and a pressure is applied thereto.

In the second solution heat treatment (ST110), heating and cooling are performed in order to restore the metal structure of the rings, which has been deformed by the rolling (ST108), to the original state.

Next, the circumferential lengths of the rolled (i.e., flattened) rings 23 are adjusted so that they exhibit circumferential lengths respectively predetermined for them (ST111). That is, the rings 23 are stretched and adjusted by applying a tension (tensile force) so that they have determined circumferential lengths.

Note that there are predetermined target values for circumferential lengths for these rings, i.e., the ring that will become the first ring, the ring that will become the second ring, and so on.

For this process in which the rings 23 are stretched by applying a tension (tensile force), contrivances are made to prevent the durability of the rings 23 from deteriorating while adjusting their circumferential lengths with a very high accuracy. (For example, Japanese Unexamined Patent Application Publications No. 2011-185300 and No. 2013-52432)

Note that one of the important points in this exemplary embodiment is that rings that are adjacent to each other in the pipe 22 become layers that are adjacent to each other even when they are assembled into a multi-layered ring. FIG. 9 shows rings that will be subjected to a circumferential length adjustment process, in which the rings are arranged so that their original order is kept. Throughout the preceding steps, the rings have been managed so that their mutual relation in the order is not disrupted. Therefore, it can be understood that the rings 23 can be arranged so that their original order is kept as shown in FIG. 9(a).

In this exemplary embodiment, 18 rings 23 are cut out from a single pipe 22 and two of multi-layered rings are created. Therefore, one of the two of multi-layered rings is referred to as a "first multi-layered ring 12A" and the other multi layered ring is referred to as a "second multi-layered ring 12B".

Further, the innermost ring in a multi-layered ring is referred to as a "first ring" and the ring layered on the outer side of the first ring is referred to as a "second ring". Further, the other rings are named in such a manner that their numbers increase from the inner side to the outer side of the rings.

Note that the first multi-layered ring 12A should be formed so that the first ring (1) becomes the first ring of the first multi-layered ring 12A (see FIG. 9(b)).

The second ring (2) becomes the second ring of the first multi-layered ring 12A.

The third ring (3) becomes the third ring of the first multi-layered ring 12A.

The remaining rings are assembled in a similar manner and the ninth ring (9) becomes the ninth ring of the first multi-layered ring 12A.

In other words, the first ring (1) is adjusted so as to have the circumferential length of the first ring of the multi-layered ring. The second ring (2) is adjusted so as to have the circumferential length of the second ring of the multi-layered ring, and so on.

The second multi-layered ring 12B is formed in a manner similar to the manner in which first multi-layered ring 12A is formed. That is, the 10th ring (10) becomes the first ring of the second multi-layered ring 12B.

The 11th ring (11) becomes the second ring of the second multi-layered ring 12B.

The 12th ring (12) becomes the third ring of the second multi-layered ring 12B. The remaining rings are assembled in a similar manner and the 18th ring (18) becomes the ninth ring of the second multi-layered ring 12B.

FIG. 9(b) schematically shows a state after circumferential length adjustments are performed for the rings 23 so that they have target circumferential lengths for the respective layers.

Figure 10:
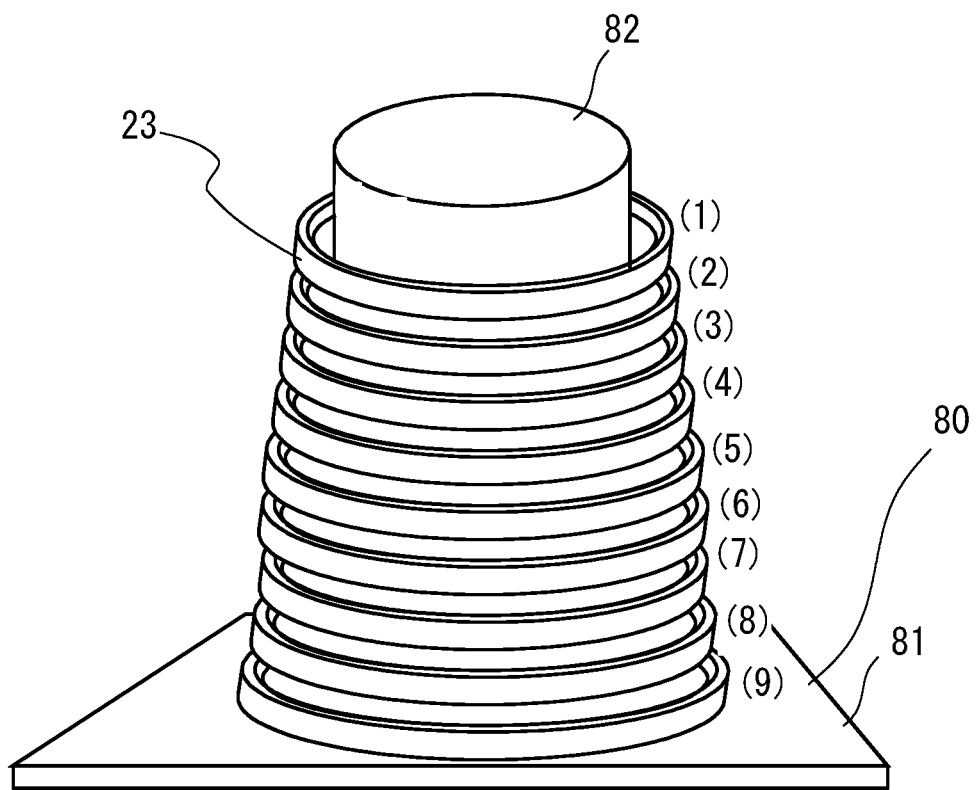
FIG. 10 shows a state where rings are set in a ring loading jig.

Subsequent to the circumferential length adjustment (ST111), a preparation for the heat treatment is made. That is, to convey the rings, for which the circumferential length adjustment (ST111) has been performed, to a heat treatment furnace, the rings 23 are set (i.e., put) in a ring loading jig 80 (ST112). FIG. 10 shows a state where the rings 23 are set in the ring loading jig 80.

One of the important points in this exemplary embodiment is that rings that become layers adjacent to each other in the multi-layered ring should be subjected to the heat treatment under roughly the same condition. In other words, rings that become layers adjacent to each other in the multi-layered ring should undergo the heat treatment while keeping their positions as close to each other as possible.

A set of rings, which will be assembled into one multi-layered ring in the future, are set in the ring loading jig.

FIG. 9 shows an example of the ring loading jig.

The ring loading jig 80 includes a bottom plate 81 and a post 82 disposed in the bottom plate 81 in a standing position, and the post 82 includes a plurality of flanges (not shown).

The ring loading jig 80 is configured so that the rings 23 are hooked by the flanges. In this way, a set of the rings 23 (i.e., nine rings 23) can be set in one ring loading jig 80.

Then, as described previously, since it is preferable that rings that become layers adjacent to each other in the multi-layered ring be subject to the heat treatment under roughly the same condition, the rings 23 are preferably set in the ring loading jig 80 so that rings that become layers adjacent to each other in the multi-layered ring are disposed adjacent to each other. In the example shown in FIG. 10, the first ring (i.e., the first ring of the multi-layered ring) is placed in the uppermost position and the second ring (i.e., the second ring of the multi-layered ring) is placed immediately below the first ring. Further, the third ring (i.e., the third ring of the multi-layered ring) is placed immediately below the second ring. (Since the remaining rings are placed in a similar fashion, explanations thereof are omitted.)

The ring loading jig 80, in which the rings 23 are set, is placed on a conveyer (not shown) (ST114) and sent to the heat treatment furnace.

The heat treatment itself is a well-known process, in which aging (ST115), oxidizing (ST116), and nitriding (ST117) are performed for the rings 23.

In the aging process (ST115), the rings are heated to a predetermined temperature, left at the raised temperature for a sufficient time period, and then cooled.

In the oxidizing process (ST116), the rings are subjected to an oxidizing process at a predetermined oxidizing process temperature in an oxidizing atmosphere, and an oxide layer is thereby generated.

In the nitriding process (ST117), the rings are subjected to a nitriding process at a predetermined nitriding process temperature in a nitriding atmosphere, and a nitride layer is thereby generated.

The heat treatment furnace includes a plurality of processing chambers partitioned by doors, and the ring loading jig 80 is successively passed through each of the processing chambers by the conveyer.

Upon completing the heat treatment (ST115 to ST117), the conveyer is carried out from the heat treatment furnace (ST118). The rings 23, for which the heat treatment has been performed, are subjected to a predetermined inspection(s) (e.g., a surface inspection ST119) and then assembled into a multi-layered ring 12. Note that since a set of rings 23, which are assembled into the multi-layered ring 12, are set in one ring loading jig 80, the nine rings 23 set in the one ring loading jig 80 may be assembled into the multi-layered ring 12 without adding or removing any rings.

After that, the multi-layered ring 12 produced in the above-described manner may be shipped.

The above-described first exemplary embodiment provides the following advantageous effects.

One of the features of the first exemplary embodiment is that rings that are adjacent to each other in the pipe 22 become layers that are adjacent to each other even when they are assembled into the multi-layered ring 12.

Note that it is unavoidable that the roll 20, which is the raw material, has some variations in plate thickness and material composition according to the place within the roll 20. (For example, regarding the plate thickness, it fluctuates by about 3 µm to 4 µm according to the place.) Further, the steel plate is bent and then both ends of it are welded together to create the pipe 22 as described above, and it is thus unavoidable that the welding quality varies according to the place within the roll 20.

Note that there is a problem that even when variations in various factors such as the material composition, plate thickness, and the welding quality are within their respective specification ranges, the amounts of the elongations of the rings after the heat treatment differ from one ring to another.

For example, even when materials whose variations in various factors such as the material composition, plate thickness, and the welding quality are within their respective specification ranges are subjected to heat treatments under the same condition, the variations in the amounts of the elongations of the rings could be about several hundred µm on either of the positive and negative sides.

Therefore, there have been many cases where even when the circumferential lengths can be accurately adjusted to their target values by the circumferential length process, which is performed before the heat treatment, the adjusted rings cannot be layered on each other according to the plan after the heat treatment. These cases have caused such troubles that the circumferential lengths of all the rings have to be measured and they have to be selectively used according to the measured circumferential lengths for the assembling.

Regarding this point, in this exemplary embodiment, rings that are adjacent to each other in the pipe 22 become layers that are adjacent to each other even when they are assembled into the multi-layered ring 12. It can be expected that rings that are adjacent to each other in the pipe 22 have substantially the same compositions, plate thicknesses, and welding quality. Further, in this exemplary embodiment, rings that become layers adjacent to each other in the multi-layered ring 12 are subjected to the heat treatment under roughly the same condition. Therefore, it can be expected that, for layers that are adjacent to each other in a multi-layered ring 12, even if they elongate to some degree in the heat treatment, their elongations have substantially the same tendencies. Therefore, the nine rings 23 can be assembled into the nine layers constituting the multi-layered ring 12 exactly according to the order of the rings 23 at the time when they are set in the ring loading jig 80. This leads to the elimination of the tasks of measuring the length of the rings 23, sorting out of the rings, and selecting the rings after the heat treatment, and consequently reduces the troublesome processes and the cost and improves the production efficiency.

Modified Example 1

Modified example 1 according to the present invention is explained.

The feature that "rings that are adjacent to each other in a pipe become layers that are adjacent to each other even when they are assembled into a multi-layered ring" in the first exemplary embodiment is considered to a best mode in that the variations among adjacent layers after the heat treatment is reduced to the limit. However, in view of the fact that each of the cut-out rings 23 has to be successively processed in turn, there is a problem that the load on the manufacturing process management is large. Note that an ultimate object (i.e., the minimum requirement) is that the rings can be eventually assembled into a multi-layered ring 12 and the assembled multi-layered ring 12 satisfies the specifications as the multi-layered ring 12 (such as an inter-layer clearance). Therefore, some replacement in the order of the rings is allowed as long as the above-described object can be attained.

Figure 11:
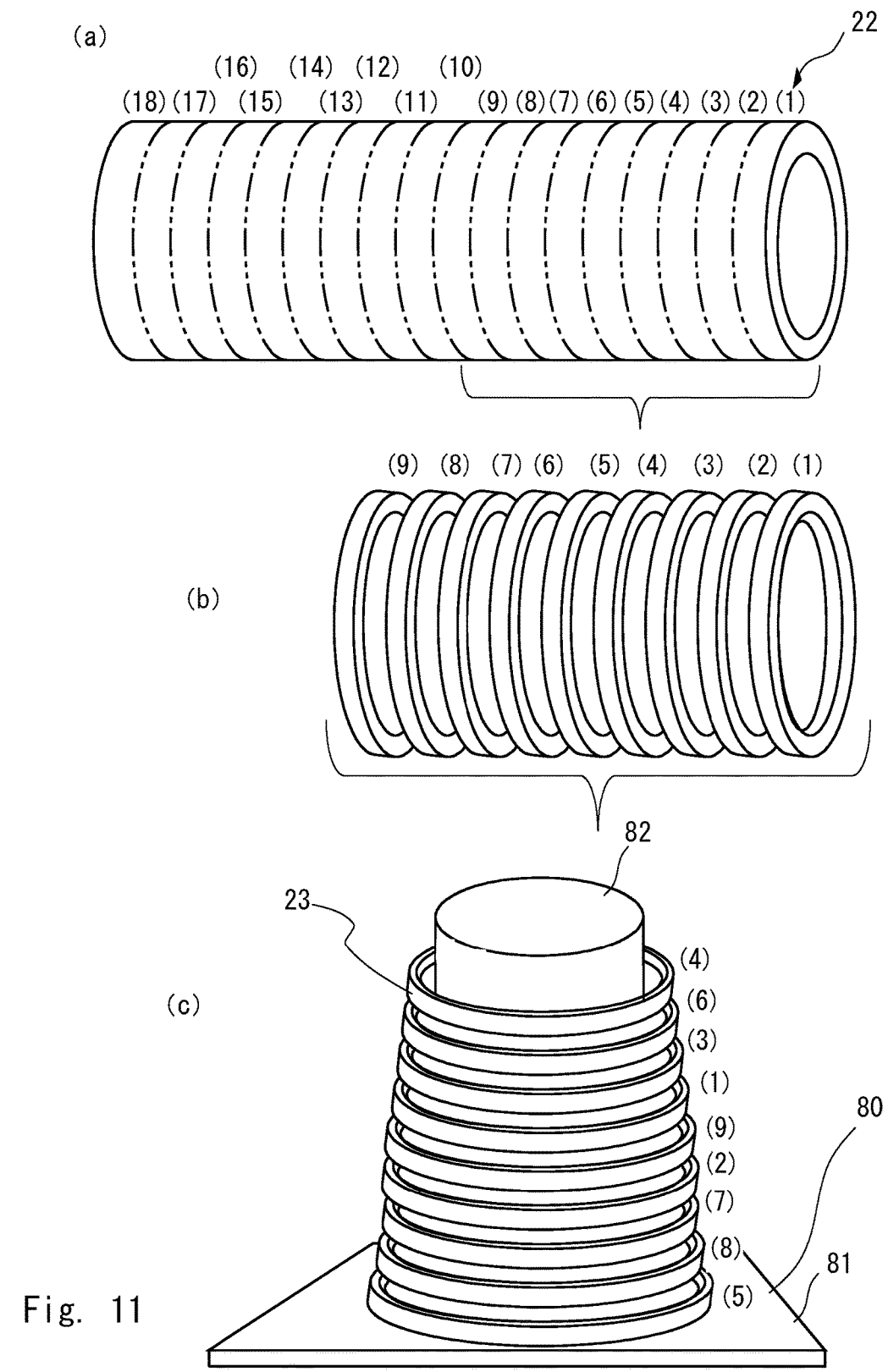
FIG. 11 shows a state where one multi-layered ring is created from a half part of a pipe as a modified example 1.

For example, as shown in FIG. 11, the order of rings can be changed within a set of rings (e.g., nine rings) that will form one multi-layered ring.

In the example shown in FIG. 11, two of multi-layered rings are created from a single pipe 22.

A first multi-layered ring is obtained from the right half of the pipe 22 and a second multi-layered ring is obtained from the left half of the pipe 22. (In FIG. 11, due to the width of the paper, the illustration for the second multi-layered ring is omitted.) That is, the first to ninth rings constituting the first multi-layered ring are cut out from the right half of the pipe 22.

Note that the order of the nine rings cut out from the right half of the pipe 22 does not need to be managed. That is, after the nine rings 23 are cut out from the right half of the pipe 22, they may be processed in a batch.

For example, the nine rings 23 may be barrel-polished together.

This leads to the loss of the information on the order of the nine rings. However, it can be expected that when the disruption in the order of rings is in the degree corresponding to one set of rings (e.g., nine rings) constituting one multi-layered ring, their compositions, plate thicknesses, and welding quality do not widely vary from one another even when their places in the pipe are apart from each other.

One of the nine rings is used as the first ring and one of the remaining rings is used as the second ring. Further, one of the remaining rings used as the third rings, and so on (the explanation of the remaining is omitted).

As a result, as shown in FIG. 11(c), the first ring (1) and the ninth ring (9), for example, could become layers adjacent to each other.

FIG. 11(c) shows an example where the first ring (1) becomes the fourth ring of the multi-layered ring and the ninth ring becomes the fifth ring of the multi-layered ring.

(Needless to say, in actuality, the information on the correspondence, i.e., information as to which rings are in which positions is already lost. Therefore, in the figure, the numbers are arbitrarily assigned.)

Even in the above-described case, it can be expected that since the compositions, the plate thicknesses, and the welding quality do not widely vary from one another, the variations in the inter-layer clearance is very small even when the rings are elongated to some degree due to the heat treatment.

When the first to ninth rings constituting the second multi-layered ring are obtained from the left half of the pipe 22, the 10th to 18th rings may be shuffled. Since the reason for this is similar to that for first multi-layered ring, repetitive explanations are omitted.

Modified Example 2

Further, Modified example 2 is explained.

In Modified example 2, replacement in the order of rings is allowed as long as it is made from a single pipe. That is, 18 rings may be cut out from a single pipe and they may be processed in a batch.

For example, 18 rings 23 may be barrel-polished together.

This leads to the loss of the information on the order of 18 rings. However, it can be expected that when all the rings are obtained from the same pipe, their compositions, plate thicknesses, and welding quality do not widely vary from one another even when their places in the pipe are apart from each other. The first multi-layered ring is created by using half of 18 rings and the second multi-layered ring is created by using the other half.

Figure 12:
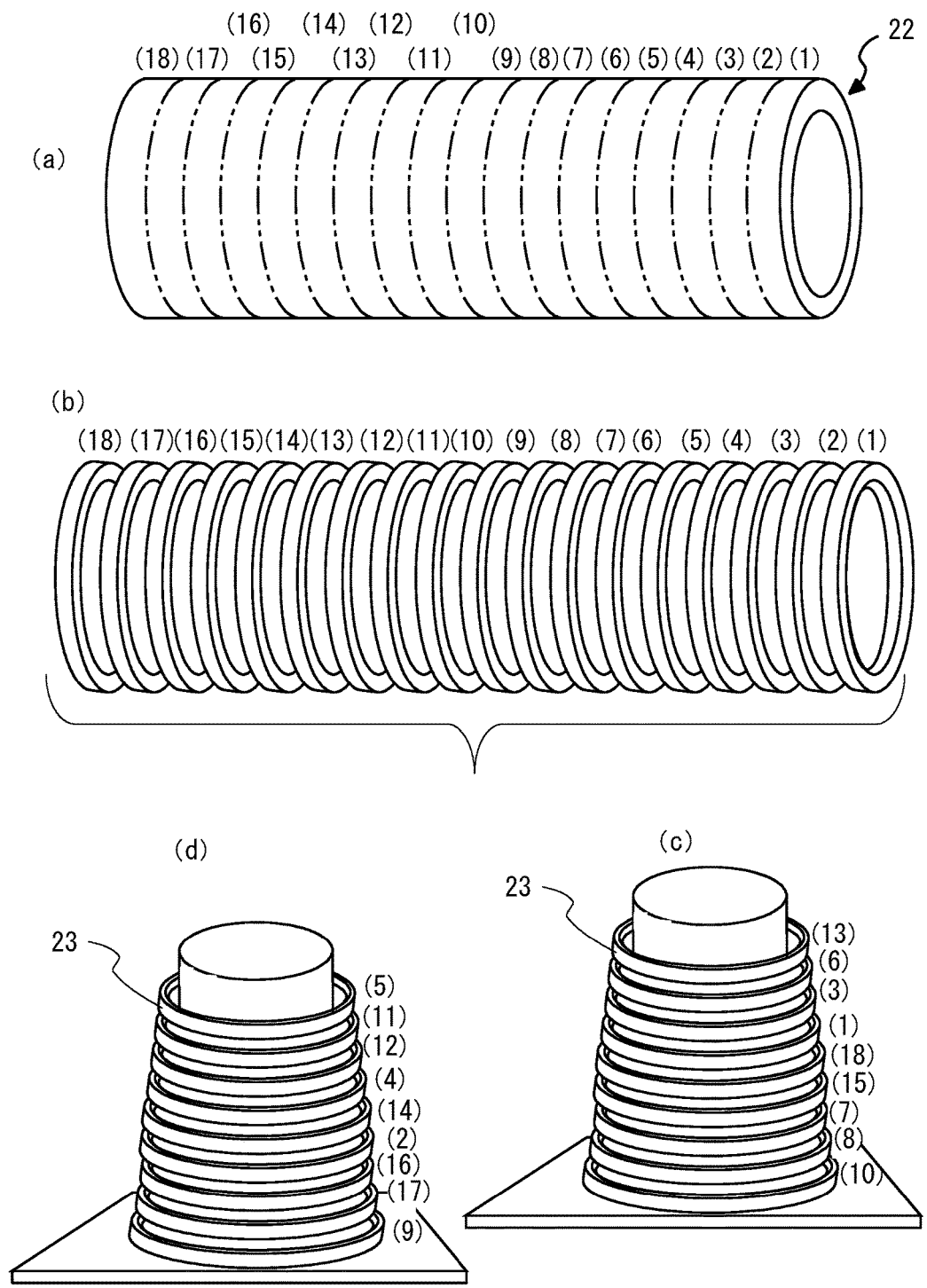
FIG. 12 shows a state where two of multi-layered rings are created from a single pipe as a modified example 2.
Figure 13:
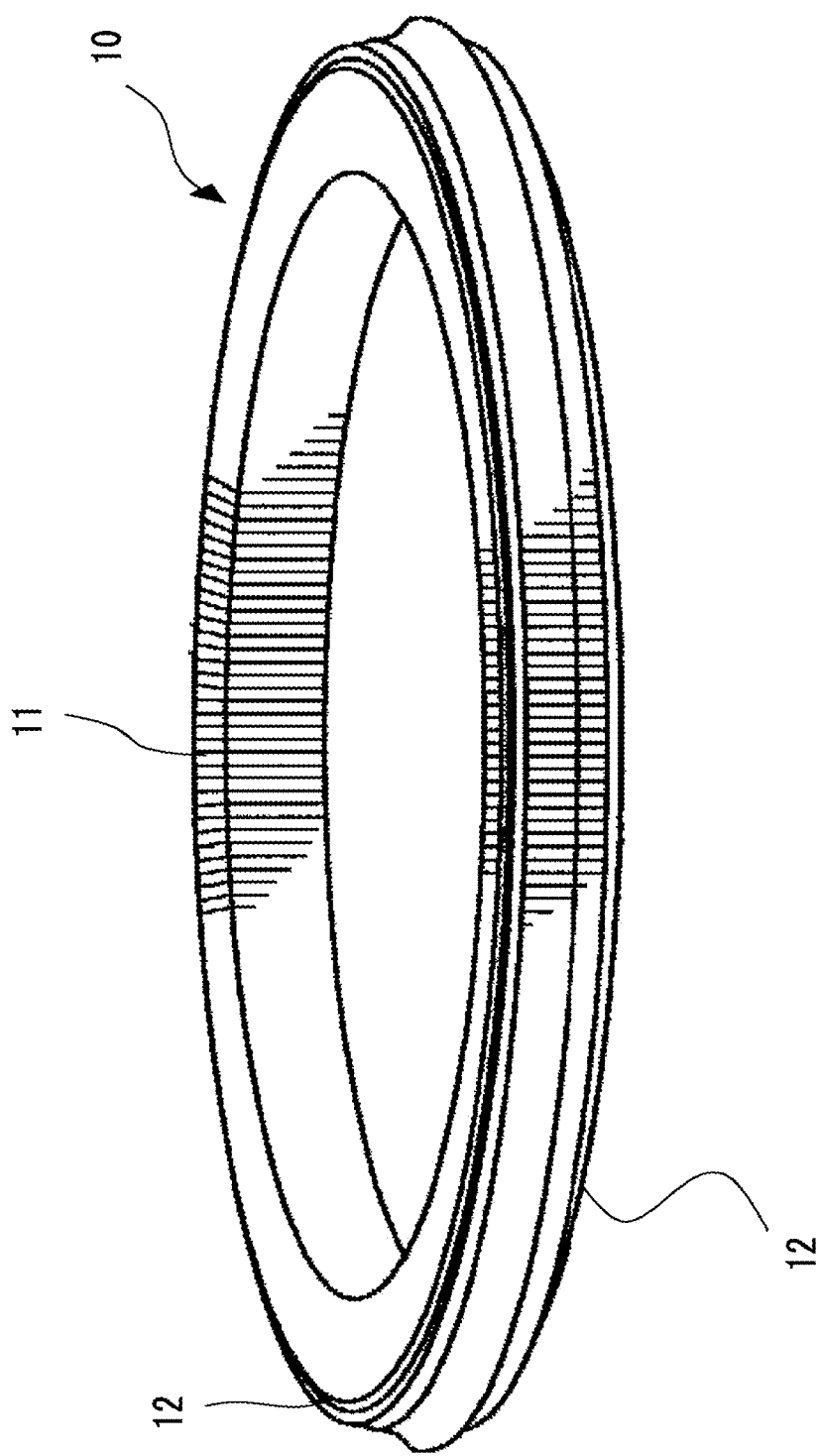
FIG. 13 is a perspective view showing an endless metal belt used for a CVT.
Figure 14:
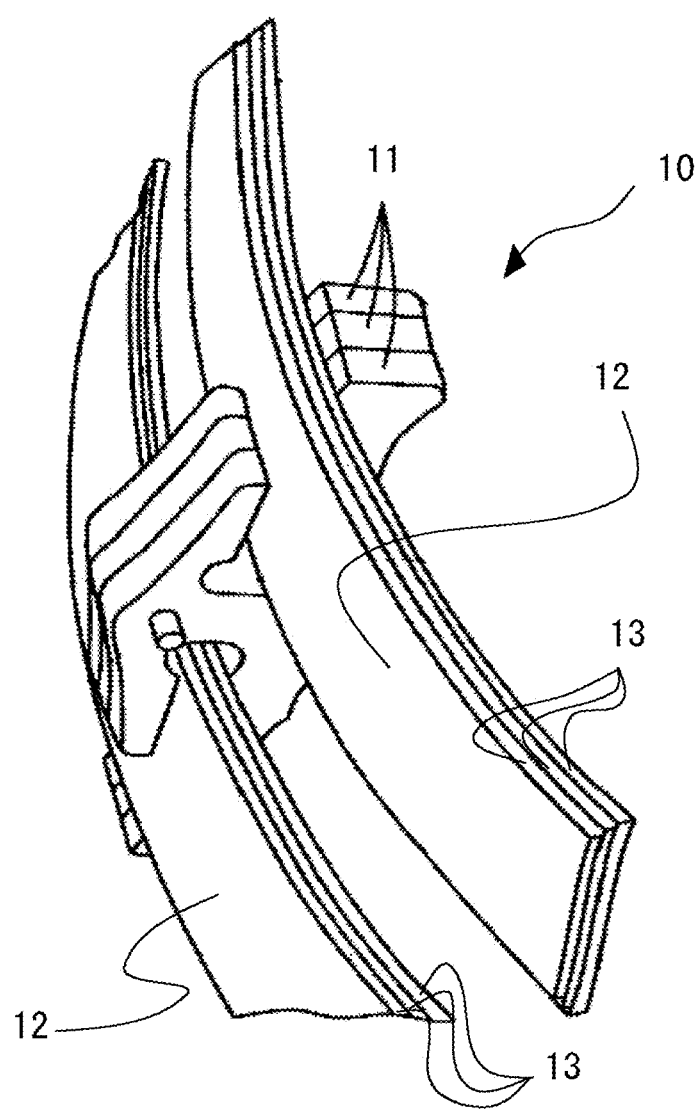
FIG. 14 is a partial perspective view showing a part of an endless metal belt that is partially disassembled.

As a result, as shown in FIG. 12, the first ring (1) and the 18th ring (18), for example, could become layers adjacent to each other. Even in the above-described case, it can be expected that since the compositions, the plate thicknesses, and the welding quality do not widely vary from one another, the variations in the inter-layer clearance is very small even when the rings are elongated to some degree due to the heat treatment.

Note that the present invention is not limited to the above-described first exemplary embodiment, and it can be modified as appropriate without departing from the sprit and scope of the present invention.

In the first exemplary embodiment, an example where each of cut-out rings is processed in turn in the subsequent processes so that the order of the cut-out rings is not changed is shown. The simplest way is to put the cut-out rings in an assembly-line system in the order in which they have been cut out so that their order is not changed. However, needless to say, there is room for various contrivances in order to improve the production efficiency.

For example, some information may be added to the rings so that they can be keep track of at a later time. For example, each of the cut-out rings may be marked so that their order can be recognized. By doing so, even when the rings are subjected to the polishing process in a batch, for example, they can be rearranged according to the original order prior to the circumferential length adjustment process and the heat treatment.

Alternatively, a plurality of rings may be processed in parallel in a plurality of lanes, provided that the order of the rings can be managed. That is, various contrivances may be made for the actual production processes.

This application is based upon and claims the benefit of priority from Japanese patent application No. 2013-132604, filed on Jun. 25, 2013, the disclosure of which is incorporated herein in its entirety by reference.

REFERENCE SIGNS LIST

10 Endless Metal Belt
11 Metal Element
12 Multi-Layered Ring
13 Endless Metal Ring
20 Roll
21 Steel Plate
22 Pipe
23 Ring
80 Ring Loading Jig
81 Bottom Plate
82 Post
90 Belt Conveyer

The invention claimed is:

1. A manufacturing method for a multi-layered ring, the multi-layered ring being formed by layering a plurality of endless metal rings having slightly different circumferential lengths on one another, the manufacturing method comprising:
    a welding step of welding ends of a steel plate together and thereby forming a cylindrical pipe;
    a ring cutting-out step of cutting the pipe at a predetermined width in a direction perpendicular to a central axis of the pipe and thereby cutting out a plurality of rings starting from one end of the pipe wherein each adjacent ring cut from the one end of the pipe is numbered in consecutive numerical order;
    a polishing step of polishing the rings;
    a circumferential length adjustment step of adjusting the plurality of rings so that the rings respectively exhibit predetermined circumferential lengths;
    a nitriding step of nitriding the plurality of rings; and
    an assembling step of assembling adjacent rings in order to layer the plurality of rings into a multilayered ring, wherein in the assembling step, the adjacent rings are arranged in the multi-layered ring according to the same consecutive numerical order in which the rings were cut from the one end of the pipe.

2. The manufacturing method for a multi-layered ring according to claim 1, wherein in the polishing step, each of the plurality of rings is polished one by one so that an order in which the plurality of rings are cut out in the cutting-out step can be kept track of.

3. The manufacturing method for a multi-layered ring according to claim 1, wherein the nitriding step is performed in a state where the plurality of rings are set in a jig in such a manner that rings that were parts originally adjacent to each other in the state of the pipe are disposed adjacent to each other in the jig.

4. The manufacturing method for a multi-layered ring according to claim 1, wherein in the circumferential length adjustment step, the circumferential length of each ring is adjusted so that rings that were parts originally adjacent to each other in the state of the pipe become layers that are adjacent to each other in the multi-layered ring.

5. The manufacturing method for a multi-layered ring according to claim 1, where the plurality of rings includes 18 rings.

* * * * *